United States Patent [19]
Blose

[11] 3,989,284
[45] Nov. 2, 1976

[54] TUBULAR CONNECTION
[75] Inventor: Thomas L. Blose, Houston, Tex.
[73] Assignee: Hydril Company, Los Angeles, Calif.
[22] Filed: Apr. 23, 1975
[21] Appl. No.: 570,633

[52] U.S. Cl. .............................. 285/332.2; 85/46; 285/334; 403/343
[51] Int. Cl.² ........................................ F16L 25/00
[58] Field of Search ........... 285/334, 333, 355, 390, 285/332.2, 332.3; 85/46; 403/343, 118

[56] References Cited
UNITED STATES PATENTS

| | | | |
|---|---|---|---|
| 671,274 | 4/1901 | Fischer ................................. | 85/46 X |
| 1,474,375 | 11/1923 | Moore ................................. | 285/355 X |
| 2,239,942 | 4/1941 | Stone et al. ........................ | 285/334 X |
| 2,267,923 | 12/1941 | Johnson .............................. | 85/46 X |
| 2,543,100 | 2/1951 | Engh ................................... | 85/46 X |
| 3,100,656 | 8/1963 | MacArthur ........................ | 285/333 X |

FOREIGN PATENTS OR APPLICATIONS

| | | | |
|---|---|---|---|
| 568,114 | 1/1933 | Germany ............................. | 403/343 |
| 137,777 | 1/1920 | United Kingdom .................... | 85/46 |

*Primary Examiner*—Thomas F. Callaghan
*Attorney, Agent, or Firm*—William W. Haefliger

[57] ABSTRACT

A pipe joint includes pin and box members having interengaged threads characterized as producing hoop tension in the pin member and hoop compression in the box members.

29 Claims, 10 Drawing Figures

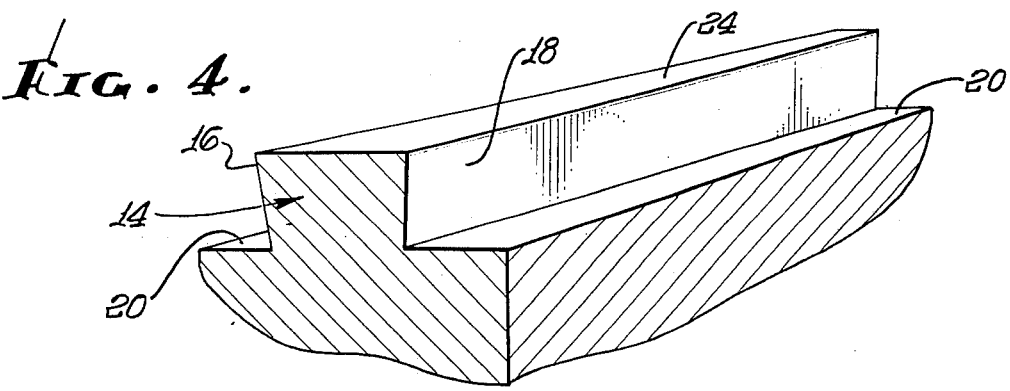
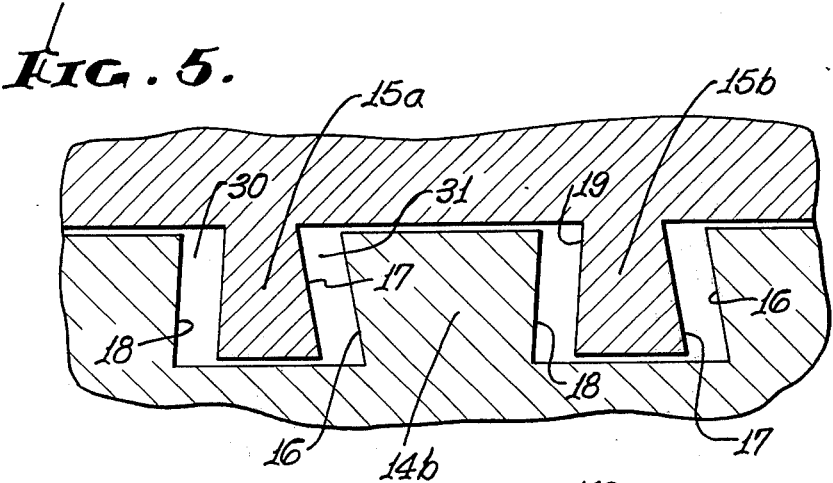
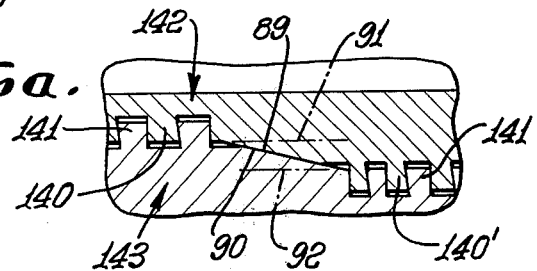
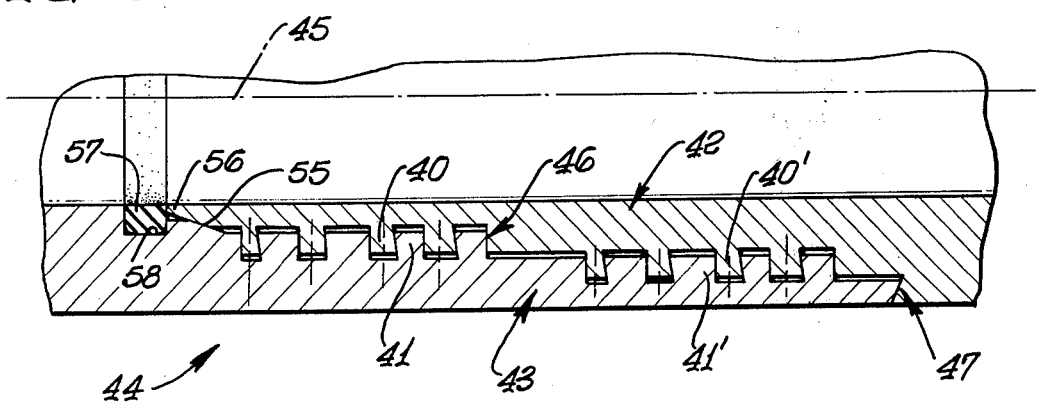

TUBULAR CONNECTION

BACKGROUND OF THE INVENTION

This invention relates generally to thread connected joints as usable in oil well tubing, casing, line pipe and drill pipe (all of which will be referred to as pipe, for convenience). More particularly, it concerns a means for connecting joint pin and box members in a manner to provide minimal hoop, radial or axial stresses induced by assembly or applied torque.

With increased concern for protection of our environment, it is becoming more important that tubular joint connections used in oil industry be capable of performing with maximum security under all conditions characteristic of the operating tasks they are relied upon to fulfill. Basic fundamental technology required to meet these performances must be satisfied through all operating stress or strain levels. Today there are no tubular connections produced anywhere in the world which will meet these requirements through all operating stress or strain conditions characteristic of services to which they may be exposed. In most cases, margins of safety are inherently smaller as severity of performance increases. There is a need for a connection that will have mechanical integrity which will not be weakened by load stresses or strains induced by tension, compression, internal pressure, external pressure, torsion, bending, thermal variances, or any combination of these until the material itself has failed by limitations of metallurgical properties in rupture or fracture.

SUMMARY OF THE INVENTION

It is a major object of the invention to provide a pipe joint meeting the above need. Basically, the joint comprises interengaged thread means on pin and box members for producing hoop tension in the pin member and hoop compression in the box member in response to forcible make-up of the members, the thread means having a dove-tail interfit. As will appear, the thread means includes helical threading on each of the pin and box members, with greater pitch distance at the thread tip than at the thread root. Also, the threading typically has progressively reducing axial width along its helical length, so that the conditions of hoop tension and compression as described will be created upon final make-up, at which time the interengaged threads preferably have wedging flank interfit to limit such make-up.

As will appear, the dove-tail (semi or full) thread flanks will interlock the elements of the connection. When torque is applied to assemble the connection, rotational movement between elements will stop when the wedges (threads) are made up on the flanks of the groove between the threads. Since the threads are wedge type and interlocked by a negative face angle on the back flank and the crests and roots are parallel, the strain reactions to applied torque are primarily axial in direction. Torque is resisted by the axial "squeezing" of the threads. Since back flank is intended to always be negative (back flank to the root plane will be less than 90°), thread strain reactions against this surface will cause the box member to be pulled radially inward and the pin member to be pulled radially outward. Therefore, the box member attains a condition of hoop compression while the pin will be in hoop tension. Excessive torque will only result in high axial squeezing forces on the threads and have very little effect in inducing other extraneous stresses other than some minor degree of bending of end threads.

Further, the threads are so designed that possible clearances between mating crests and roots will be minimal while flanks will be in wedging interference. In this manner the threads will be functionally leak resistant. The primary resistance to leakage through this connection will typically be accomplished by a separately functional metal to metal seal. One or more such seals may be incorporated for this requirement. In any case, the seals will be located adjacent to or within the thread areas so that they can receive the benefits of the interlocking threads. When properly located and suitable interference (radial) established, the leak resistance of the connection will not be affected by torque, tension, internal or external pressures, bending axial compression, or radical thermal changes in response to internal or externally applied termperature differences.

It is another object of the invention to provide a pin and box connection employing thread means as described which will interlock in such manner as to prevent opening up of a seal between the members in response to fluid pressure (internal or external) application to the seal zone; further, it is an object to provide the interlock at axially opposite sides of the seal zone so that the pin and box members are clamped against relative radial separation at opposite ends of the seal zone, preventing opening up of the latter in response to fluid pressure application.

Accordingly important objects and benefits to be obtained from a tubular connection constructed as described are:

1. To offer torsional strength equivalent to that of the full pipe body, without the use of either an internal or an external shoulder.
2. To obtain a joint strength in either tension or compression equivalent to the strength of the full pipe body.
3. To resist radial strain differentials caused by the application of either external or internal pressures which normally reduce the effective interferences between sealing elements.
4. To mechanically interlock the two joint elements so that high bending stresses will be ineffective to the leak resistant integrity of the connection.
5. To produce a connection or non-upset pipe that will have full performance properties comparable to those of integral upset products.
6. To make it possible to recover used or damaged upset pipe by cutting off the upset ends and apply the new connection as threaded and coupled, with performance capabilities comparable to new integral upset end connections.
7. To make a connection for line pipe that will be virtually self-locking with high resistance to unscrewing.

These and other objects and advantages of the invention, as well as the details of illustrative embodiments, will be more fully understood from the following description and drawings, in which:

DRAWING DESCRIPTION

FIG. 4 is a perspective showing of a projected thread as seen in FIG. 3;

FIG. 5 is a view like FIG. 2, but showing the threading prior to completion to make-up;

FIG. 6 is a section in an axial radial plane through a two-step pipe joint embodying the invention;

FIG. 6a is a view like FIG. 6 showing a variation;

DETAILED DESCRIPTION

Figure 1:
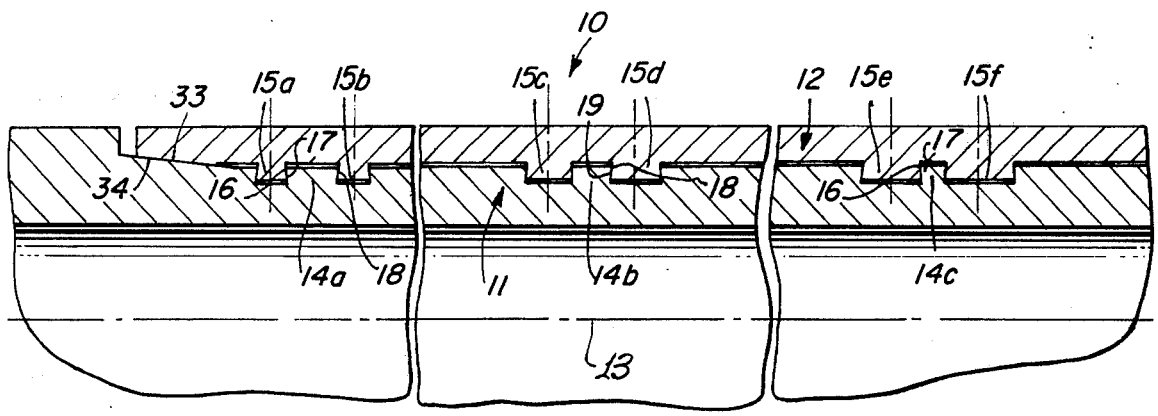
FIG. 1 is a section in an axial radial plane through a pipe joint embodying the invention.

Referring first to FIGS. 1–5, a pipe joint 10 includes pin and box members 11 and 12, the joint defining an axis 13. Interengaged thread means on the members include helical threading or threads 14 and 15 characterized as producing hoop tension in the pin member, and hoop compression in the box member in response to forcible make-up of the members. As such time, the threads 14 and 15 have dove-tail interfit as at flank 16 on thread 14 engaged with flank 17 on thread 15, and opposite flank 18 on thread 14 engaged with flank 19 on thread 15. In other words, the angles α and β as shown are acute, angle α formed between flank 18 and root wall 20 of thread 14 (or between flank 19 and root wall 21 of thread 15); and the angle β formed between flank 16 and root wall 20 (or between flank 17 and root wall 21). Walls 20 and 21 are cylindrical, and parallel to axis 13. Note the clearances at 22 and 23 between those root walls and the cylindrical tips 24 and 25 of the threads 14 and 15, respectively. Further, flanks 16 and 18 on thread 14 flare toward the thread tips 24, and flanks 17 and 19 flare toward thread tip 25. Thus threads 14 and 15 define full dove-tail.

It will be noted the helical thread 14 has greater pitch distance (i.e. in an axial direction) between flanks 16 and 18 at the thread tip than at the thread root; likewise, helical thread 15 has greater axial pitch distance between flanks 17 and 19 at the thread tip than at the thread root. Further, each thread 14 and 15 has progressively reducing width, or pitch distance, along the helical length thereof. This is clear from FIG. 1 by comparison of the widths of the thread 15 at locations 15a... 15f, and of the widths of the thread 14 at axially spaced locations 14a... 14c. The linear projection of thread 14 in FIG. 4 clearly shows progressive width decrease along the thread length. At the same time, the pitch distance between corresponding points on successive thread turns, in axial radial planes, is the same as is clear from comparison of FIGS. 2 and 5.

Figure 2:
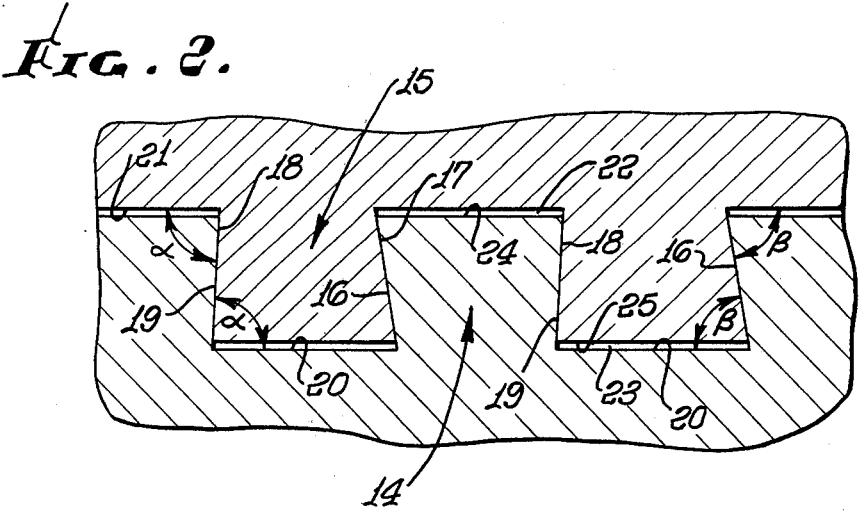
FIG. 2 is an enlarged view of made-up threading (full dove-tail) in the FIG. 1 joint.
Figure 3:
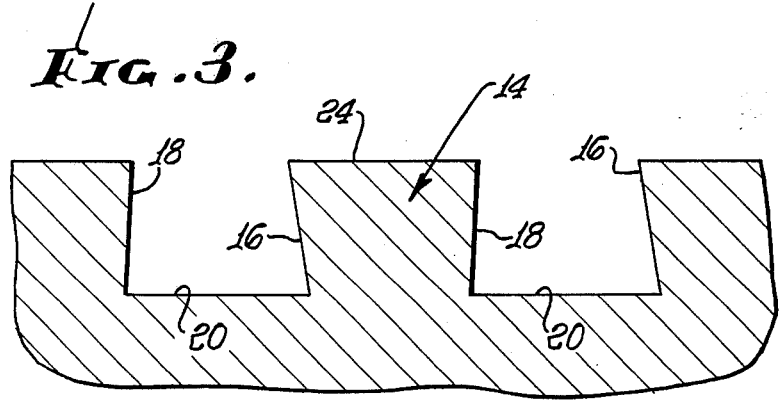
FIG. 3 is an enlarged view of pin or box member threading as seen in FIG. 2.

It is a further clear from FIGS. 1 and 2 that the threads 14 and 15 have vertically wedging interfit to limit make-up. Prior to completion of such make-up, i.e. in partially made-up condition, there are gaps between the threads 14 and 15, as is clear from FIG. 5. The latter may, for exmaple, illustrate the position of thread section 15a, as it is rotated past section 14b, such section also being indentified in FIG. 1. Note gaps 30 and 31 in FIG. 5.

The angles α and β should be less than about 85° to enable the interengaged flanks to resist unscrewing or disassembly of the joint. When the connection is assembled power tight, the sealing surfaces will be locked together because of the thread from which secures the two joint elements in intimate contact through any degree of, or direction of, radial strain. Maximum load stresses can be transmitted through the connection in any direction (radial or axial) without disengagement of the two mating elements. Multi-directional stresses may be applied without decreasing performance capabilities of the connection. The wedging action of the front and back flanks of made up threads not only offers a positive stop for make-up without the use of an auxiliary shoulder but offers maximum attainable resistance to torque, tension, compression, or any other induced load condition without resulting in detrimental strain reaction to the sealing qualities of the joint. This flank wedging action also prevents the normal tendency of threads to bend or deflect under high axial load conditions which normally lead to possible "pull-out" or joint separation followed by leakage, or telescoping from compressive loads. The connection is securely interlocked in a manner which resists strain differentials between the two joint elements when subjected to load stresses in any direction or from any operational cause.

FIG. 1 also shows the provision of annular beveled shoulders 33 and 34 on the respective members 11 and 12, and having metal-to-metal sealing interfit in response to joint make-up. In addition, the interengaged flanks 16 and 17, and 18 and 19, provide metal-to-metal seals along the thread length.

Figure 7:
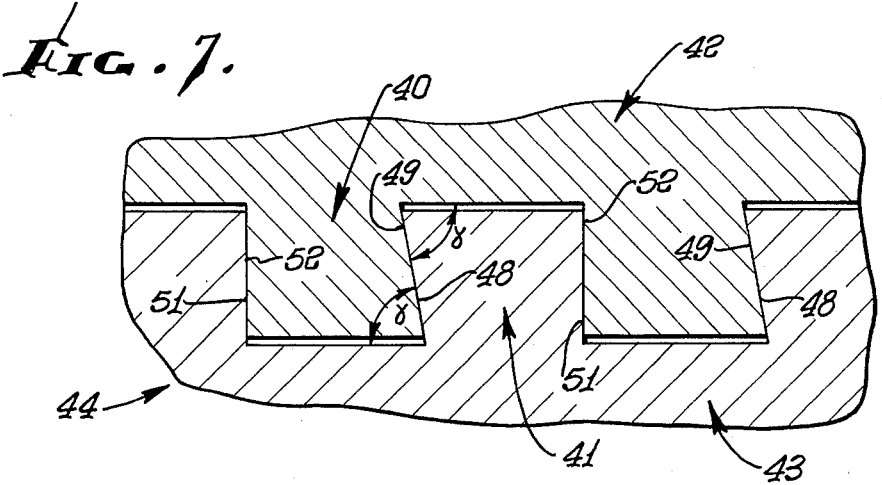
FIG. 7 is an enlarged view of made-up threading (semi-dove-tail) in the FIG. 6 joint.
Figure 8:
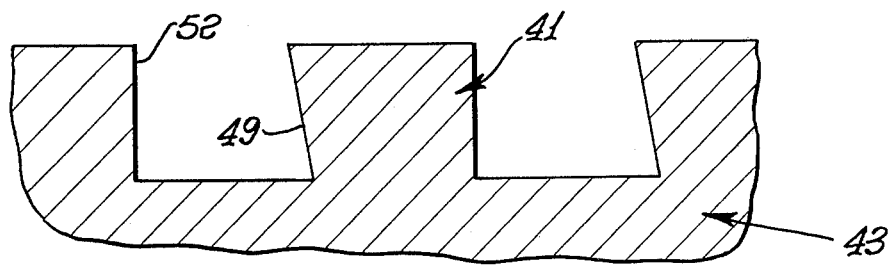
FIG. 8 is an enlarged view of pin or box member threading as seen in FIG. 7.

FIGS. 6–8 illustrate another form of the invention, wherein semi dove-tail threads 40 and 41 are formed on pin and box members 42 and 43 forming joint 44. The latter is shown in the form of a two step thread, with a second pair of threads 40' and 41' (corresponding to threads 40 and 41) at a greater radius from the center line or axis 45 than threads 40 and 41. Note metal-to-metal annular seals which are established at locations 46 and 47 upon full make-up of the joint.

In FIG. 7, the angularity γ of interengaged flanks 48 and 49 (of respective threads 40 and 41) from the direction of the axis 45 should be less than about 85°, but greater than zero, in a manner similar to angles α and β in FIG. 2; on the other hand, interengaged flanks 51 and 52 on threads 40 and 41 extend radially, in axial radial planes.

Referring back to FIG. 6, a tapered metal-to-metal annular seal is formed at 55 between the pin and box members; also, the nose 56 the pin 42 annularly engages a non-metallic (as for example molded tetrafluoroethylene) seal ring 57 received in an annular recess 58 in the box member 43 to block leakage of corrosive well fluid to the interengaged threads.

Figure 9:
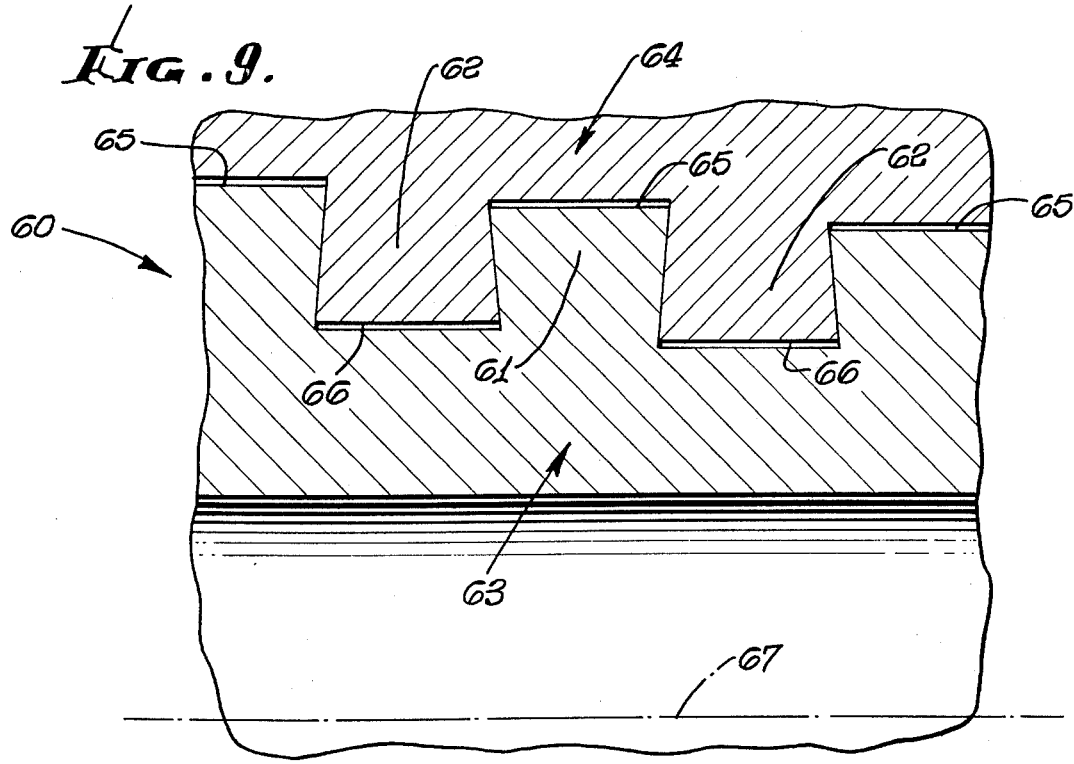
FIG. 9 is a view like FIG. 2 but showing axially tapering threading.

FIG. 9 illustrates an application of the invention to a joint 60 wherein threads 61 and 62 on pin and box members 63 and 64 taper, axially. Note the fully dovetailed threading of the type seen in FIG. 2; however the tips 65 and 66 of the threads progress toward axis 67 along the thread lengths.

FIG. 6a is like FIG. 6, but varies in that annular shoulders are provided on the members at 89 and 90, these being axially tapered as shown. Such shoulders come into pressural interengagement upon make-up of the members, and have sealing interfit in a zone between axial cylinders indicated at 91 and 92. Cylinder 91 is defined by the crests of threads 140 (corresponding to threads 40 in FIG. 6) which mesh with threads 141 (corresponding to threads 41 in FIG. 6), and cylinder 92 is defined by the crests of threads 141' (corresponding to threads 41' in FIG. 6) meshing with threads 140' (corresponding to threads 40' in FIG. 6).

The interengaged threads at the two steps serve to positively lock or clamp the pin and box members 142 and 143 together against relative radial separation, at or proximate opposite ends of the sealing interfit shoulders 89 and 90, whereby the latter cannot open up to leak fluid pressure therebetween. All of this may be provided in a non-upset joint, or in an upset joint, as desired. Fracture of the joint cannot occur at the seal zone because strain is minimized or non-existent in the members defining the seal zone, due to the positive interlock provided by the interlocked threads.

Finally, the thread elements of the connection may be either single or multiple pitch. The variance in pitch between joints will be related to product requirements of performance rather than size or other physical dimensions.

I claim:

1. In a pipe joint including pin and box members, the joint having an axis,
   a. a pair of interengaged threads on said members for producing hoop tension in the pin member and hoop compression in the box member in response to forcible make-up of said members,
   b. the threads on said members having dove-tail interfit,
   c. said thread on each member having progressively changing axial width along substantially the entire helical length thereof and at selected radical distance from said axis, whereby upon complete make-up of the joint the interengaged thread flanks produce forces tending to urge the members radially together.

2. The joint of claim 1 wherein each thread has greater pitch width at the thread tip than at the thread root.

3. The joint of claim 2 wherein each thread has opposite flanks one of which in axial radial planes extends radially.

4. The joint of claim 3 wherein the other flank flares toward the thread outer extent relative to said one flank in axial radial planes.

5. The joint of claim 2 wherein each thread has opposite flanks both of which flare toward the outer extent of the thread in axial radial planes.

6. The joint of claim 2 wherein said threads have opposed tips and root walls with clearances formed therebetween, thread flanks forming angles with said thread tips and root walls in axial radial planes, said angles being less than about 85°.

7. The joint of claim 2 wherein the threads on said members in fully made up condition have mutually wedging interfit to limit said make-up.

8. The joint of claim 2 including annular shoulders on said members having sealing interfit in response to said make-up.

9. The joint of claim 8 wherein both of said shoulders are metallic.

10. The joint of claim 8 wherein at least one of said shoulders is non-metallic.

11. The joint of claim 1 including a second pair of interengaged threads like said first pair, said two pairs defining a multiple-step thread.

12. The joint of claim 1 wherein said threads are axially tapered.

13. The joint of claim 11 including annular shoulders on said members having sealing interfit between two of the thread steps.

14. The joint of claim 13 wherein said sealing interfit shoulders taper axially, the interengaged threads at said two steps locking the pin and box members together against relative radial separation at opposite ends of said sealing interfit shoulders.

15. In a pipe joint including pin and box members, the joint having an axis,
   a. annular shoulders on the members having sealing interfit, and
   b. first and second interengaged threads on the respective members, the threads having dovetail interfit and locking the members together against relative separation proximate one axial side of said annular shoulders, each thread having progressively changing axial width along substantially the entire helical length thereof at selected radial distance from said axis, whereby upon complete make-up of the joint the interengaged thread flanks produce forces tending to urge the members radially together.

16. The pipe joint of claim 15 including third and fourth interengaged threads on the respective members, the third and fourth threads having dovetail interfit and locking the members together against relative separation proximate the other axial side of said annular shoulders, each of the third and fourth threads having progressively changing axial width along substantially the entire helical length thereof at selected radial distance from said axis.

17. In a joint including pin and box members, the joint having an axis,
   a. a pair of interengaged threads on said members for producing circumferential tension in the pin member and circumferential compression in the box member in response to forcible make-up of said members,
   b. the threads on said members having dove-tail interfit,
   c. said thread on each member having progressively changing axial width along substantially the entire helical length thereof and at selected radial distance from said axis, whereby upon complete make-up of the joint the interengaged thread flanks produce forces tending to urge the members radially together.

18. The joint of claim 17 wherein each thread has greater pitch width at the thread tip than at the thread root.

19. The joint of claim 18 wherein each thread has opposite flanks, one of which in axial radial planes extends radially.

20. The joint of claim 19 wherein the other flank flares toward the thread outer extent relative to said one flank in axial radial planes.

21. The joint of claim 18 wherein each thread has opposite flanks both of which flare toward the outer extent of the thread in axial radial planes.

22. The joint of claim 18 wherein said threads have opposed tips and root walls with clearances formed therebetween, thread flanks forming angles with said thread tips and root walls in axial radial planes, said angles being less than about 85°.

23. The joint of claim 18 wherein the threads on said members in fully made up condition have mutually wedging interfit to limit said make-up.

24. The joint of claim 18 including annular shoulders on said members having sealing interfit in response to said make-up.

25. The joint of claim 24 wherein both of said shoulders are metallic.

26. The joint of claim 24 wherein at least one of said shoulders is non-metallic.

27. The joint of claim 17 including a second pair of interengaged threads like said first pair, said two pairs defining a multiple-step thread.

28. The joint of claim 17 wherein said threads are axially tapered.

29. The joint of claim 24 wherein said sealing interfit shoulders taper axially, the interengaged threads locking the pin and box members together against relative radial separation at opposite ends of said sealing interfit shoulders.

* * * * *